(12) United States Patent
Schottland et al.

(10) Patent No.: US 7,600,021 B2
(45) Date of Patent: Oct. 6, 2009

(54) DELTA REPLICATION OF SOURCE FILES AND PACKAGES ACROSS NETWORKED RESOURCES

(75) Inventors: Paul Joseph Lyman Schottland, Redmond, WA (US); Gaurav Raghu Dhawan, Kirkland, WA (US); David C. James, Bothell, WA (US); Rajagopalan Badri Narayanan, Redmond, WA (US); Martin Napier Dey, Bellevue, WA (US); Daniel Nicholas Joseph Drew, Bothell, WA (US); Doyle S. Cronk, Kirkland, WA (US); Zhengkai Kenneth Pan, Redmond, WA (US); Bruce W. Copeland, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 569 days.

(21) Appl. No.: 10/116,775

(22) Filed: Apr. 3, 2002

(65) Prior Publication Data

US 2003/0220944 A1 Nov. 27, 2003

(51) Int. Cl.
*G06F 15/173* (2006.01)
(52) U.S. Cl. .................. 709/226; 709/203; 709/223; 707/203
(58) Field of Classification Search ............. 709/223, 709/226, 205, 213, 200, 203, 224, 247; 707/200–205
See application file for complete search history.

(56) References Cited

U.S. PATENT DOCUMENTS

| | | | | |
|---|---|---|---|---|
| 5,630,116 A * | 5/1997 | Takaya et al. | ............... | 707/201 |
| 5,806,078 A * | 9/1998 | Hug et al. | ............... | 715/511 |
| 5,813,017 A * | 9/1998 | Morris | ............... | 707/204 |
| 5,845,090 A | 12/1998 | Collins, III et al. | | |
| 5,995,980 A * | 11/1999 | Olson et al. | ............... | 707/201 |
| 6,018,747 A * | 1/2000 | Burns et al. | ............... | 707/203 |
| 6,052,531 A | 4/2000 | Waldin, Jr. et al. | | |
| 6,138,153 A | 10/2000 | Collins, III et al. | | |
| 6,163,811 A * | 12/2000 | Porter | ............... | 709/247 |
| 6,286,041 B1 | 9/2001 | Collins, III et al. | | |
| 6,301,589 B1 * | 10/2001 | Hirashima et al. | ............... | 707/204 |
| 6,314,565 B1 * | 11/2001 | Kenner et al. | ............... | 717/171 |
| 6,338,092 B1 * | 1/2002 | Chao et al. | ............... | 709/236 |
| 6,351,467 B1 * | 2/2002 | Dillon | ............... | 370/432 |
| 6,389,582 B1 * | 5/2002 | Valainis et al. | ............... | 716/9 |
| 6,389,592 B1 * | 5/2002 | Ayres et al. | ............... | 717/172 |
| 6,516,327 B1 * | 2/2003 | Zondervan et al. | ............... | 707/200 |
| 6,526,574 B1 * | 2/2003 | Jones | ............... | 717/168 |
| 6,529,960 B2 * | 3/2003 | Chao et al. | ............... | 709/238 |
| 6,647,399 B2 * | 11/2003 | Zaremba | ............... | 707/204 |
| 6,671,703 B2 * | 12/2003 | Thompson et al. | ............... | 707/202 |

(Continued)

FOREIGN PATENT DOCUMENTS

EP 0981099 2/2000

*Primary Examiner*—Saleh Najjar
*Assistant Examiner*—Faruk Hamza

(57) ABSTRACT

The disclosed arrangements and procedures replicate source files across networked resources. Specifically, a server receives a package update notification corresponding to a difference between a previous set of source files and one or more new sets of source files. Responsive to receiving the package update notification, a delta set of source files that correspond to the difference are identified. A set of source and/or distribution servers in an enterprise network that are configured for delta replication is determined. The identified delta set of source files is communicated to the determined source and/or distribution servers.

25 Claims, 5 Drawing Sheets

U.S. PATENT DOCUMENTS

| | | |
|---|---|---|
| 6,757,696 B2 * | 6/2004 | Multer et al. ............... 707/201 |
| 6,816,872 B1 * | 11/2004 | Squibb ....................... 707/200 |
| 6,944,856 B2 * | 9/2005 | Taylor ........................ 717/171 |
| 7,185,063 B1 * | 2/2007 | Kasriel et al. ............... 709/216 |
| 2002/0002703 A1 | 1/2002 | Baentsch et al. |

* cited by examiner

DELTA REPLICATION OF SOURCE FILES AND PACKAGES ACROSS NETWORKED RESOURCES

TECHNICAL FIELD

The following description relates to enterprise management. More particularly, the disclosed subject matter pertains to the installation and maintenance of software applications within enterprise networks.

BACKGROUND

The Internet and the World Wide Web (www) have had a dramatic effect on corporate networks, with companies using them for electronic commerce and Internet access as well as client/server applications and traditional network services such as e-mail. Efficient systems and network management practices can cut and control costs by enabling efficient asset management practices, reducing the need for labor-intensive tasks such as the installation, maintenance, and reconfiguration of software, minimizing the cost of wide area data communication links, minimizing the cost of systems related downtime, providing the proper level of services, and much more.

Installing and maintaining software in an enterprise network is a major cost to corporations with locations across a wide geographical area. This is because most of the cost of maintaining a corporate computer system typically comes from software installation, support, and maintenance. Several vendors offer enterprise-wide management solutions to install and maintain software applications across the enterprise.

Unfortunately, conventional enterprise-wide management software installation and maintenance techniques are substantially limited in that they typically require a considerable and possibly prohibitive amount of enterprise network bandwidth to communicate large amounts of data across the enterprise network to perform such software installation, updates, or repairs.

For instance, conventional enterprise-wide management techniques to install, update, or repair software applications typically involve sending complete software packages to any number of source file distribution points (DPs) in the enterprise. A full software package includes, for example, one or more complete software applications along with all of the corresponding files (e.g., data, configuration, scripting files, and so on) that may be needed for installation, removal, repair, or other maintenance of the included software application(s). A DP is the location from which an end-user installs software application source files for new software application installations, updates, and/or repairs. An enterprise may have thousands of DPs to service the software requirements of various networked devices (e.g., end user computers, printers and other peripheral devices, network appliances, and so on).

Each package that is communicated from the centralized source file server to a target DP, can include any number of files (e.g., possibly tens, hundreds, or thousands of files) that are required for the proper execution and configuration of the particular software application. Additionally each package's software installation/removal scripts ensure that any previously installed versions of the software application(s) are removed from the target DP, before they copy the current contents of the package onto the target DP. In light of this, it is clear that conventional enterprise-wide management software installation and maintenance techniques generally require utilization of a considerable and potentially prohibitively expensive amount of network bandwidth to install and/or maintain software at each DP in the enterprise.

These and other limitations of traditional systems and procedures to install, update, and otherwise maintain software applications across enterprise networks are addressed by the following described arrangements and procedures.

SUMMARY

The disclosed arrangements and procedures replicate source files across networked resources. Specifically, a server receives a package update notification corresponding to a difference between a previous set of source files and a one or more new sets of source files. Responsive to receiving the package update notification, a delta set of source files that correspond to the difference are identified. A set of source and/or distribution servers in an enterprise network that are configured for delta replication is determined. The identified delta set of source files is communicated to the determined source and/or distribution servers.

BRIEF DESCRIPTION OF THE DRAWINGS

The same numbers are used throughout the drawings to reference like features and components.

FIG. 4 shows further exemplary aspects of communicating delta source to those sites that are DR enabled.

FIG. 5 shows further exemplary aspects of communicating delta packages to those sites that are DR enabled.

DETAILED DESCRIPTION

Figure 1:
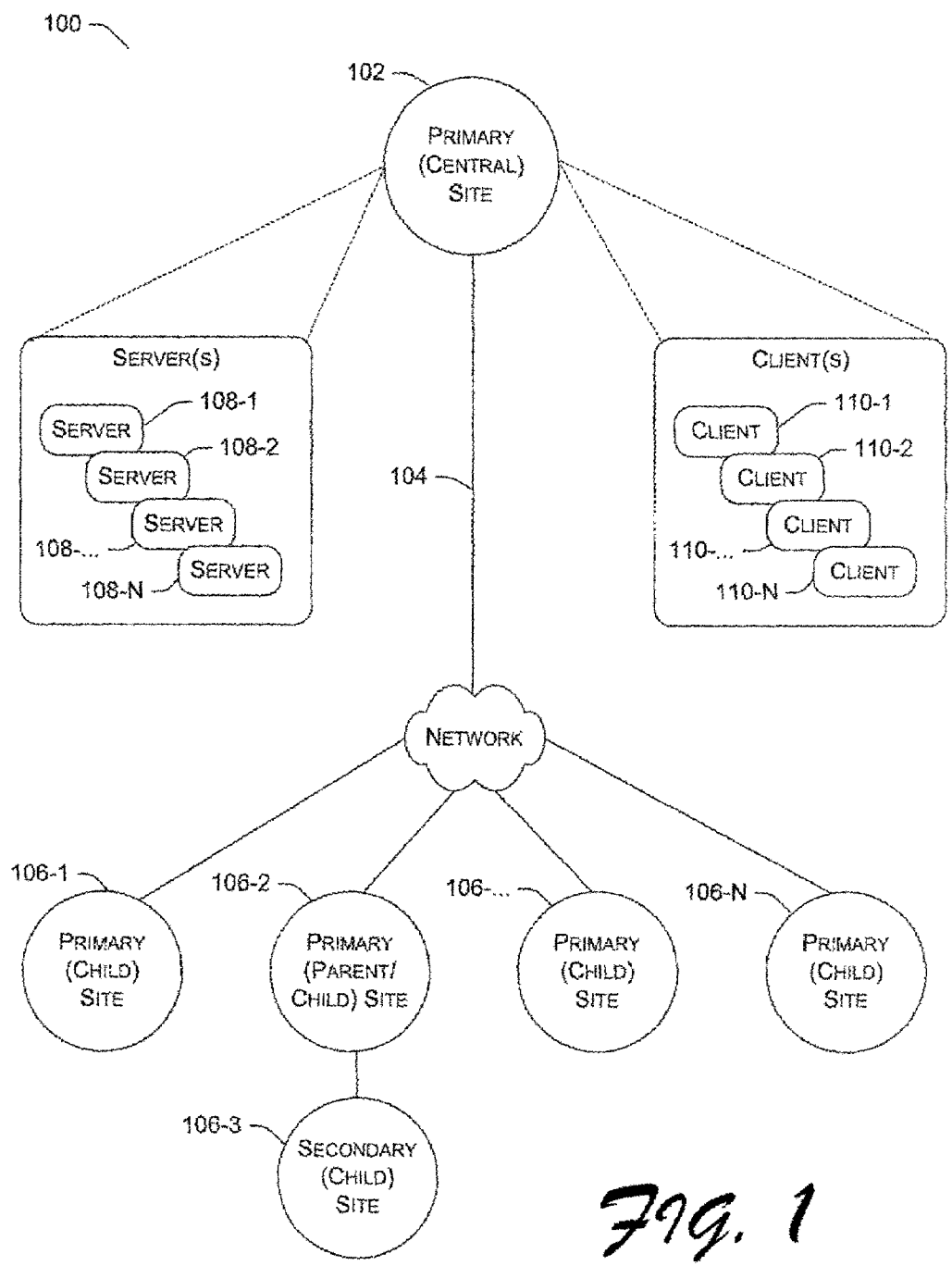
FIG. 1 shows an exemplary system to perform delta replication of source files and packages across networked resources.

The following description sets forth exemplary subject matter to perform delta replication of source files and packages between locations with sub-locations. The subject matter is described with specificity to meet statutory requirements. However, the description itself is not intended to limit the scope of this patent. Rather, the inventors have contemplated that the claimed subject matter might also be embodied in other ways, to include different elements or combinations of elements similar to the ones described in this document, in conjunction with other present or future technologies.

Overview

The described subject matter performs delta replication of source packages and files to distribute software to networked computers. Specifically, a centralized or primary server within an enterprise network generates and distributes either full or delta packages to install, upgrade, repair, and/or generally maintain software at distribution points within the enterprise. Such a primary server and distribution point, for example, can be represented with respective servers that are executing portions of Microsoft's System Management Server® (SMS) technology, which has been appropriately modified to incorporate the novel teachings of this detailed specification.

Whether source files are distributed in a full package, a delta package, or as delta source (i.e., mirrored copies of only the source changes/updates), the distributed package will include all the files (e.g., software source files, removal and/or installation scripts, data files, etc.) that a distribution point requires to install, upgrade, repair, or generally maintain the particular site's software inventory. (End users can access and install site software on their respective clients by accessing the site's software inventory). Specifically, a full package includes scripts to completely remove, if necessary, all files from the DP that correspond to any previous installations of the software application. The full package also include scripts to completely install all of the source files, data files, scripts, and so on, onto the DP that correspond to the software application.

In contrast to such full packages, a delta package or delta source includes only the differences, changes, or deltas—as compared to a previous installation on the particular DP, that are required to upgrade, repair, or otherwise maintain the software application on the DP. Once received by a DP, unpacking the delta file may cause the removal of one or more previously installed source files, data, files, scripts, or the like, as well as corresponding counterpart replacement with the respective upgraded and/or repaired versions.

Additionally, a centralized enterprise server may generate the delta package such that it upgrades a source file or software application on a particular DP from one particular version to another version. In this example, if the source file or application on the particular DP is several versions out of date as compared to a current version on the centralized server, the generated delta package is configured to only include those files that are needed to remove and install the differences between the various versions on the particular DP. Such a process is called "normalization" since it causes software inventory at particular DPs to be synchronized with software inventory at a primary parent server (which may or may not be the central server of the enterprise).

Moreover, if source must be replicated to many varying states based on the respective requirements of each DP, delta replication builds and distributes separate delta packages such that each DP is updated with respect only to the files that it requires to properly update the particular DP to a current version state (or to a requested version state). (If a new DP or source location is to be generated, delta replication will send a full package or full source to that particular site, so that may begin to act as a source location for files).

Since efficient movement of source files is crucial to minimizing expensive and potentially prohibitive bandwidth usage between discrete locations within a large or physically disparate enterprise, the described delta source file and package replication between locations with sub-locations may substantially reduce enterprise-wide management software distribution copy times and communication path bandwidth consumption as compared to the conventional distribution techniques described in the background section.

An Exemplary System

FIG. 1 shows an exemplary system 100 to implement delta replication of source files and packages from a central parent site (e.g., site 102) across a communication path 104 such as a network (e.g., an organizational intranet and/or the Internet) to any number of child sites 106. Each site (i.e., the primary and secondary sites of 102 through 106) is a set of one or more domains that exist on a same local area network (LAN). A domain is a set of servers and clients (e.g., the servers 108 and clients 110 shown with respect to site 102) that are managed as a group within a respective site 102 or 106. (Aspects of exemplary servers 108 are described in greater detail below in reference to FIGS. 2-4).

Parent and child sites are represented in system 100 by organizing sites into a hierarchy. A parent site (e.g. site 102) is a site (central and/or primary) which includes other sites (e.g. sites 106) beneath it in the hierarchy. A child site is a site (primary or secondary) that reports to a parent site above it the in the hierarchy. A primary site stores system data such as software inventory information, etc., for itself and its sub-sites (e.g., system data can be stored locally in a database such as an SQL database). A secondary site reports its data (e.g., software inventory information) to a primary site and does not store data for other sites. Each primary and secondary site in system 100 is able to communicate data (e.g., software inventory, delta replication packages, and so on) to its respective parent site and any immediate child sites.

In this exemplary system 100, site 102 is a parent site that is also a central site because it is at the top of the system 100 or site hierarchy. Thus, central site 102 is also a primary site for storing system-wide information for managing the distribution of source files in full packages and/or delta replication packages for all other sites 106. In another example, primary site 106-2 is a parent site (e.g., a patent of site 106-N) as well as a child site (e.g., of central/primary site 102).

Accordingly, the system 100 includes a central site 102 and any number of sub-sites 106. Thus, the particular architecture of system 100 is scalable and can be configured to fit particular organization, management, and/or administrative requirements (e.g., the parent/child site hierarchy of system 100 can be nearly flat, or can be quite deep, with few or many sites).

Although servers 108 and clients 110 are illustrated as corresponding to site 102, each other site 106 also has respective servers 108 and clients 10. Each server 108 is a source server and/or a distribution server. A source server 108 includes original source files to be distributed to the distribution servers 108 located at sub-sites 106 (a "sub-site" is a child site of the current site). A distribution server 108 receives delta source files (e.g., as a mirror copy) and/or unpacks full or delta replication packages that are distributed by a source server 108, thereby making the files (i.e., received delta source or package files) available for clients 110 at the site. This means that although the following description may refer to communicating delta source and/or delta packages 218 from a source server 108 or 200 to a distribution server 108, it can be appreciated that the delta source/package 218 receiving distribution server 108 may in its own right be a source server 108 for distributing the received delta source/package 218 to other distribution servers 108 located at sub-sites 106. (Aspects of exemplary servers 108 are respectively described in greater detail below in reference to FIGS. 2-4).

Whether a particular server 108 is configured as a source and/or a distribution server 108 is determined according to administrative needs for system 100. However, because primary site 102 is also the central site 102 (i.e., it stores system-wide information to manage distribution of source files for all other primary and secondary sites) of site hierarchy 100, the central site has at least one source server 108. Additionally, each site (primary or secondary) must have at least one distribution server 108.

A client 110 is any computing device that includes a processor coupled to a memory, wherein the memory includes computer executable instructions to receive and install source files into the memory and report source file inventory to a distribution server 108. (Memory includes any combination of volatile and nonvolatile computer-readable media for reading and writing). Accordingly, a client device 110 is operational as any one of a number of different computing devices 110 such as a personal computer, an image server computer, a thin client, a thick client, a hand-held or laptop device, a multiprocessor system, a microprocessor-based system, a set top box, programmable consumer electronics, a wireless phone, an application specific integrated circuit (ASIC), a network PC, minicomputer, mainframe computer, and so on.

An Exemplary Delta Package and Source File Server

Figure 2:
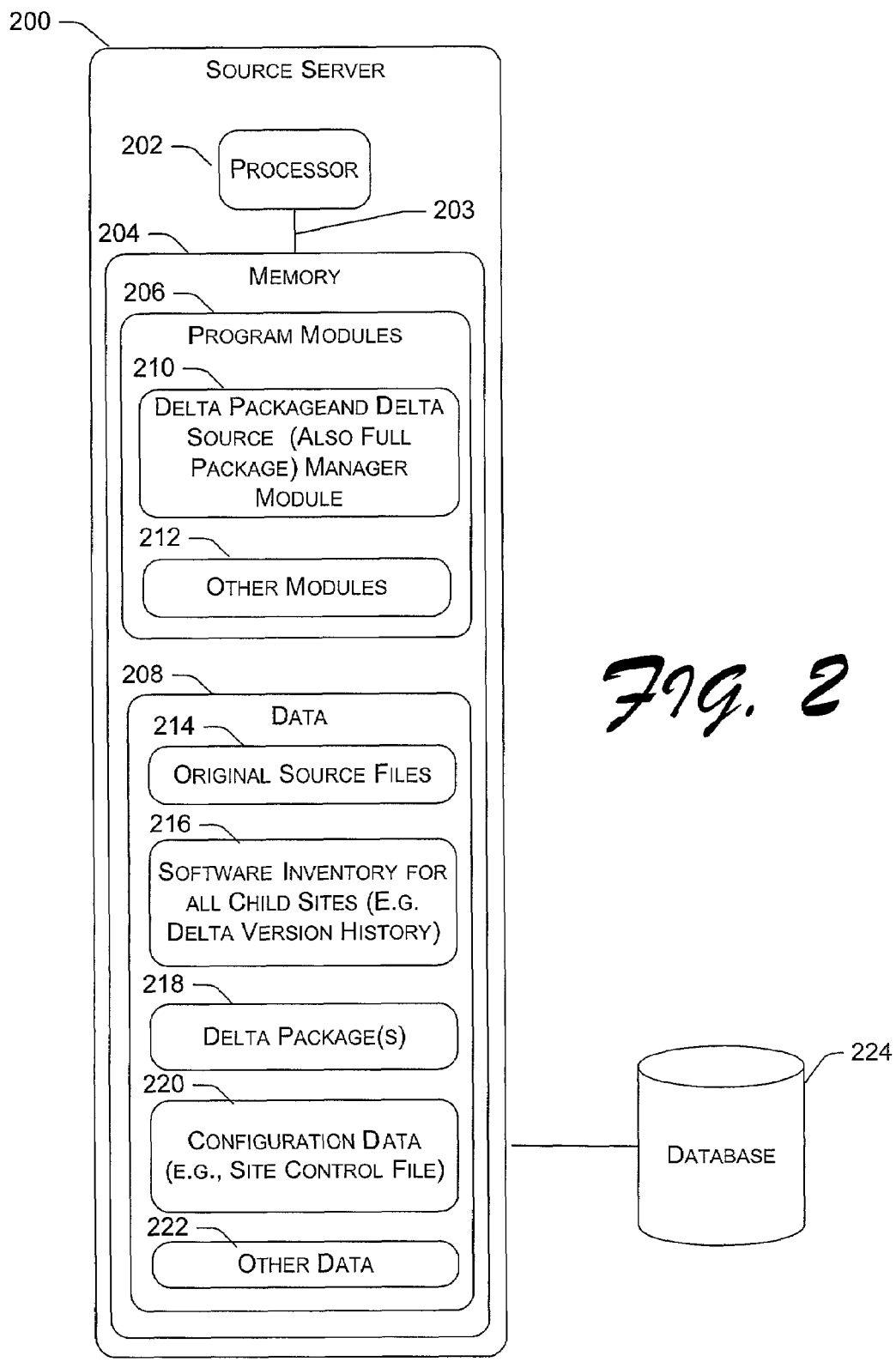
FIG. 2 shows aspects of an exemplary source server of FIG. 1 to manage distribution of source files in an enterprise by replicating delta source and/or delta packages to any number of primary and secondary sites in a site hierarchy.

FIG. 2 shows aspects of an exemplary source server 200 (e.g., a source server 108 of FIG. 1) for storing system-wide information to manage distribution of source files in full and or delta replication packages and/or as delta source files to any number of primary and secondary sites in a site hierarchy 100 of FIG. 1. The source server 200 includes a processor 202 coupled across a bus 203 to a system memory 204.

Bus 203 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

The system memory 204 includes a variety of computer-readable media. Such media may be any available media that is accessible by the processor 202, and it includes both volatile and non-volatile media, removable and non-removable media. For example, the system memory 204 includes computer readable media in the form of volatile memory, such as random access memory (RAM), and/or non-volatile memory, such as read only memory (ROM). A basic input/output system (BIOS), containing the basic routines that help to transfer information between elements within computer 200, such as during start-up, is stored in ROM. RAM typically contains at least portions of data 208 and/or program modules 204 that are immediately accessible to and/or presently be operated on by processor 202.

The processor 202 is configured to fetch and execute computer program instructions from applications or program modules 206 portion of memory 204. Program modules 204 may be described in the general context of computer-executable instructions being executed by a computer. Generally, program modules 204 include routines, programs, objects, components, data structures, etc., that perform particular tasks or implement particular abstract data types.

An exemplary system and procedure to perform delta replication of source files and packages across networked resources is practiced in a distributed computing environment 100 of FIG. 1, where tasks are performed by remote processing devices that are linked through a communications network. Accordingly, program modules 204 may be located in both local and remote computer storage media including memory storage devices.

The program modules 204 of source server 200 include, for example, the delta package and delta source manager module 210, and other applications 212 (e.g., an operating system, enterprise-wide administrative console applications, a Web browser, and so on). The processor is also configured to fetch data from the data 208 portion of memory 204 while executing the program modules 204. Data 208 includes, for example, original source files 214 software inventories 216 for the site hierarchy, delta packages 218, configuration data 220, and other data. Exemplary aspects of the modules 206 and data 208 are now described.

The full and delta package manager module 210 facilitates the installation, upgrade, repair, and/or configuration of software applications and other source files 214 at various DP sites 106 in an enterprise network. To accomplish this, the manager module 210 builds, maintains, and communicates full packages, delta packages 218, and/or delta source (e.g., at least one source files 214) to these various DPs along with specified scripts or jobs. The combination of packages and jobs allows the manager module 210 to communicate software over a LAN or wide area network (WAN), distribute software and other data to specified DP servers in a site 106, and remove software or source files 214 from specified sites 106 (e.g., servers 108).

A full package includes all source files 214 (including data, scripts, and so on) corresponding to a particular application, regardless of whether or not certain ones of the source files 214 have been changed, updated, and so on, and others have not. In other words, a full package does not include only the changes or "deltas" as compared to a previous version of the package. Upon receipt of a full package, a distribution server 108 stores the package in a database (if it is a primary site), and if the package is compressed, decompresses the package before storing its respective contents to memory such as a database for client 110 access and for possible further distribution to other distribution servers 108 at subsites 106 (if any).

In contrast to a full package, a delta-package or delta source 218 includes only those source files 214 that have changed since a previous package (full or delta) had been communicated to one or more particular sub-sites 106. For instance, a source server 108, and in particular the package manager module 210, builds a delta package 218 to update a particular distribution server 108 with only those source files 214 that that particular distribution server 108 needs.

Accordingly, the manager module 210 generates delta packages 218 or identifies delta source 218 to replicate any number of the various configurations of source files 214 corresponding to an application. Because a delta package 218 includes only source file changes, updates, fixes, corresponding scripts (for automating installation and configuration of the delta package 218 contents), or the like, the distributed delta packages can be substantially smaller in size than the full packages, which have traditionally been communicated to distribution servers 108. Communicating smaller delta packages 218 (as with delta source 218) to any number of distribution servers 108 in a large and/or physically disparate enterprise will have substantially less impact on an enterprise's limited communication path data through-put or bandwidth and processing resources.

Upon receipt of a delta package 218, a distribution server 108 stores the delta package 218 in a database (if it is a primary site), and if the package is compressed, decompresses the package before storing its respective contents to memory such as a database for client 110 access and for possible additional distribution to other distribution servers 108 at sub-sites 106 (if any).

Figure 3:
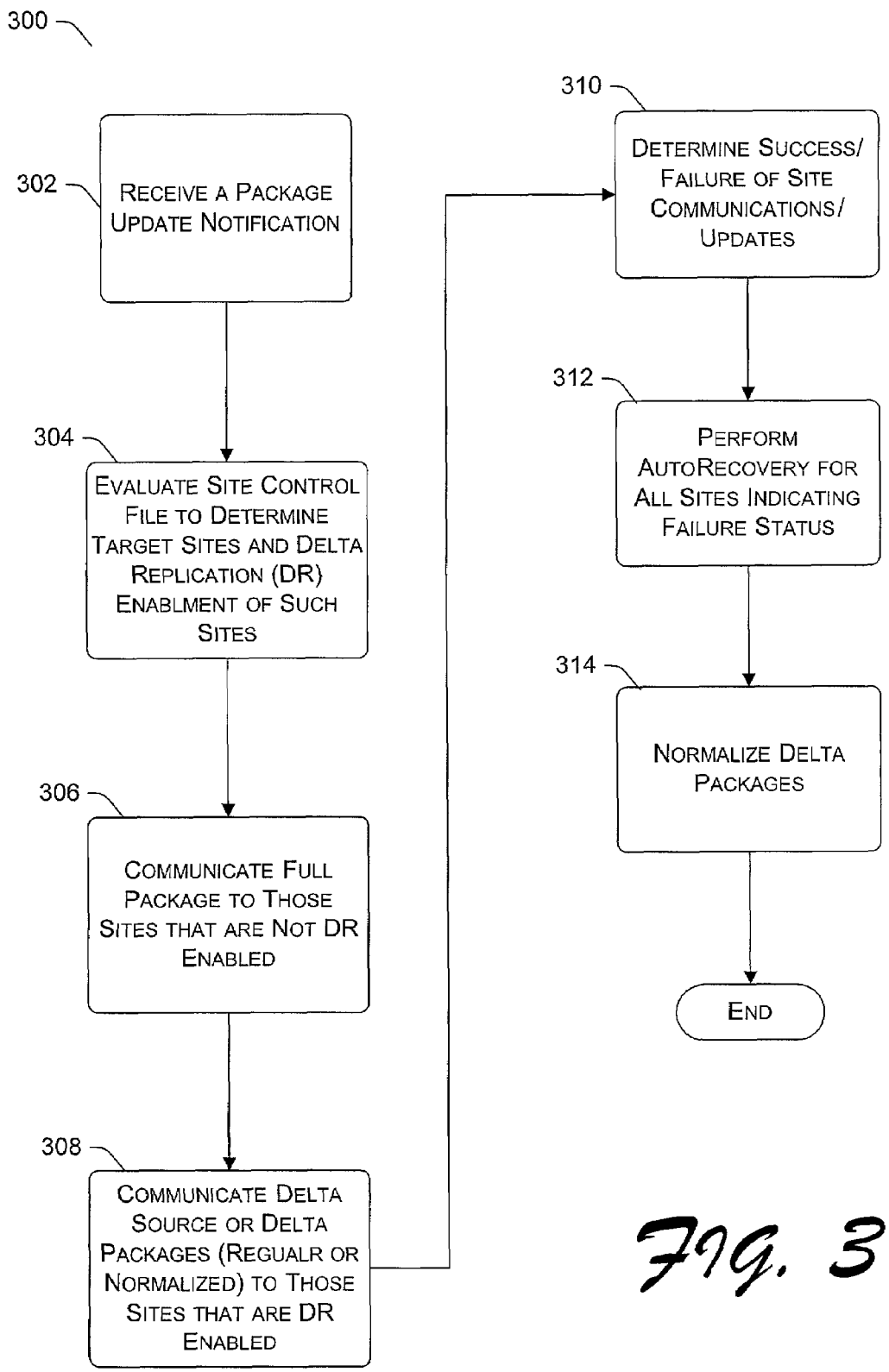
FIG. 3 shows an exemplary procedure to perform delta replication of source files and packages across networked resources.
Figure 4:
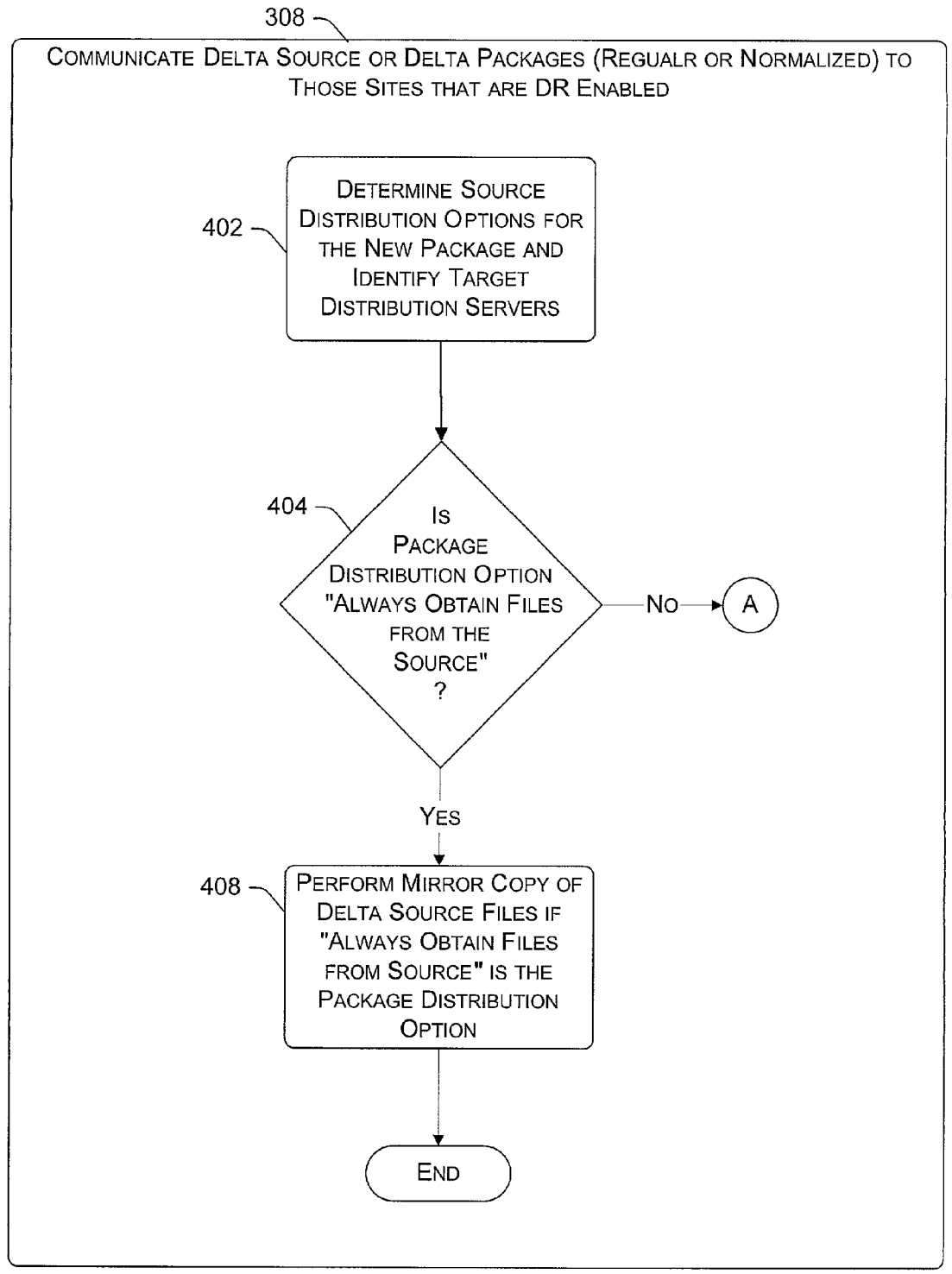
FIG. 4 shows further aspects of the exemplary procedure of FIG. 3 to perform delta replication (DR) of source files and packages across networked resources. Specifically.

Further aspects of the delta package and source file manager 210 are now described with respect to an exemplary delta package application programming interface (API) and an exemplary procedure 300 of FIGS. 3 and 4, each of which further elaborate on corresponding aspects of the generation, maintenance and distribution of delta source files and/or packages 218.

An Exemplary API for the Creation and Manipulation of Delta Packages

The package manager module 210 exposes a number of novel delta replication file APIs to build, maintain, and distribute delta source files and/or packages 218 (along with specified scripts or jobs) to distribution servers 108. (The delta source file and/or package generation, maintenance, and distribution API is hereinafter referred to as the delta package API). API can be implemented in any number of ways. For instance, the delta package API may be implemented as Component Object Model (COM) objects. COM is a well-known object-oriented programming model that defines how objects interact within a single application or between applications. In COM, client software accesses an object through a pointer to an interface-a related set of functions called methods-on the object. A set of exemplary delta file APIs are now described.

A create compressed file delta interface compares a file source to an original file (both represented by source files 214), which may or may not be compressed. Comparison is based on file records stored in the original file; if the file is compressed, no decompression is required. If a file has been added or changed it is compressed and added to the delta package 218 (a changed file replaces its corresponding out of date file in the package). If a particular file has been removed from an application, this interface will add a record or flag to the delta package 218 indicating that the particular file has been removed from the corresponding full package 222.

A merge compressed file delta interface merges a changed or delta file into a compressed file. In other words, this interface adds, replaces, or removes entries from the compressed file according to the contents of the delta file. This is accomplished by creating a temporary output file within which is generated a new compressed file by adding data from either the delta file or the original compressed file as required. The old file in the full package 222 is then replaced with the new file.

A normalize compressed file deltas interface takes a list of sequential delta files and removes redundant data from older deltas to conserve disk space as well as to reduce network data throughput a delta update requires (e.g., if a file is added to a first delta, removed from a second delta, and then added again with some modifications (i.e., as compared to the file in the first delta) to a third delta, the file will be communicated only one time to a particular distribution server, regardless of the three delta versions.

A merge compressed file deltas interface takes a list of sequential delta files and creates a single file that contains all of changes in the original file. Applying this delta to the compressed file is equivalent of applying each of the original deltas to the source location from which the clients will install the application/files.

A replicate package interface evaluates a package version difference at a destination child site 106, and creates the appropriate delta package 218. For instance, a get remote package version interface determines the lowest distribution server 106 package version of the child site distribution point version entry, as expressed in the database at the parent site. This difference between the package versions between the parent site in the lowest distribution point package version is communicated to the create package delta interface to merge the deltas of these versions to create a complete delta package 218 to be communicated to the child site 106.

A create package delta interface merges deltas of intermediate delta package versions to create an up-to-date delta package to be sent to any child site 106. If any intermediate deltas are missing or corrupt, they are deleted from the compressed package source folder on site 102 where the package is created, and any deltas for that package comprising versions earlier than a corrupt version are also marked for deletion.

A get remote package version function queries for delta in full package versions of the source 214 on a parent site, parent site distribution points, child site and child site distribution points. This interface returns a minimum of the source 214 version for the site 106 specified.

An Exemplars Procedure for Delta Package Generation and Management

FIG. 3 shows an exemplary procedure 300 to perform delta replication of source files and packages across networked resources. At block 302, a package update notification message is received by a centralized source server 102 of FIG. 1. Such a notification message indicates that there has been update, modification, or some change to a full or complete package 222 of source files that presently resides on the centralized server 102. An administrator at an administrative console (e.g., an SMS administrator console) can generate such a notification message responsive to updating the source files in the full package 222.

When such a full package 222 is generated and/or updated, and the administrator specifies a particular package data source option to indicate whether: (1) a compressed copy of source files (a package) should be communicated from a respective source server 108 to respective distribution servers 108; or, (2) the source files should be communicated in an unpackaged form (i.e., delta source files) from the source directory 214 or 224 on the source server 108 to respective distribution servers 108.

The package data source option can be associated with a particular package 222 in a number of different ways. For example, a package data source option can be stored on a source server 108 as configuration data 220, software inventory data 220, as a header in the particular package 222, and so on.

At block 304, responsive to having received the package update notification (block 302), the package manager evaluates a site control file 220. This evaluation identifies specific target site(s) 106 to receive the update and further indicates whether the distribution server(s) 108 at the target site 106 is configured for delta replication (DR); i.e., the ability to receive and manage the update as a delta package/source 218. A server 108 is delta enabled if a server 108 is able to both receive delta updates and generate delta updates for any child distribution points and/or sites.

At block 306, the package manager 210 communicates full package is 222 to those distribution servers 108 that are not DR enabled.

At block 308, the package manager 210 communicates a delta package or delta source to those distribution servers 108 that are DR enabled. (Whether or not a particular site 106 is sent a delta package or source depends on the package data source option of the package 222 that corresponds to the received package update notification (block 302); these aspects are described in greater detail below in reference to FIG. 4.) At block 310, the package manager 210 performs auto-recovery for all sites 106 that indicate that communication of a particular delta package 218 (regular or normalized) was unsuccessful for some reason (e.g., due to communication failure, corrupt data, etc.). Such a success/failure indication can be determined in the number of ways. For instance, a distribution server 108 may communicate a status message to the sending source server 108, wherein the status message indicates the success or failure of receiving or installing the communicated delta package or delta source 218.

To perform the auto-recovery operation of block 312, the package manager 210 may again attempt to send the newly generated delta package 218 (regular or normalized) to those distribution servers 108 that indicated prior failure to receive, install, or otherwise configure the communicated package 218 or 222. Alternatively, the package manager 210 may communicate a compressed updated full package 222 to a distribution server 108 that indicates such a failed status. (An exemplary compressed updated full package 222 is described in greater detail below in reference to block 408 of FIG. 4). In this manner, the package manager 210 is able to perform an auto-recovery mechanism in the event of delta package/source communication/installation failures with respect to distribution servers 108.

At block 314, the delta package manager 210 normalizes delta packages 218 by removing redundant data from older delta packages 218. Specifically, the package manager 210 evaluates the contents of previously generated delta packages 218 with respect to the contents of the newly generated delta package 218 (block 308). The contents of respective older delta packages 218 can readily be determined in view of the delta version history data file 216 of FIG. 2, which maintains such information. Data storage requirements can be further reduced by normalizing all cached delta packages 218 (i.e., corresponding to a particular full package 222) into a single most recent delta package 218.

FIG. 4 shows further aspects of the exemplary procedure 300 of FIG. 3 to perform delta replication of source files and packages across networked resources. Specifically, FIG. 4 shows further exemplary aspects of communicating delta source or delta packages to those sites 108 that are DR enabled, as described above with respect to block 308 of FIG. 3.

At block 402, it having been determined that DR is enabled at a particular site 106 (block 304 of FIG. 3), the delta package manager 210 at the central source server 108 determines the particular data source options that were previously selected for distribution of the new package 222. (I.e., as discussed above with respect to block 302 of FIG. 3, when a package 222 of source files 214 is generated for the first time, an administrator specifies a particular the package 222 data source option. The data source options are: (1) use a compressed copy of the source; or, (2) always obtain files from the source directory. The package manager 210 generates and distributes delta package(s) 218 differently for parent site 106 DPs 108 based on which particular option was selected by the administrator when the package 222 was distributed for the first time.

Figure 5:
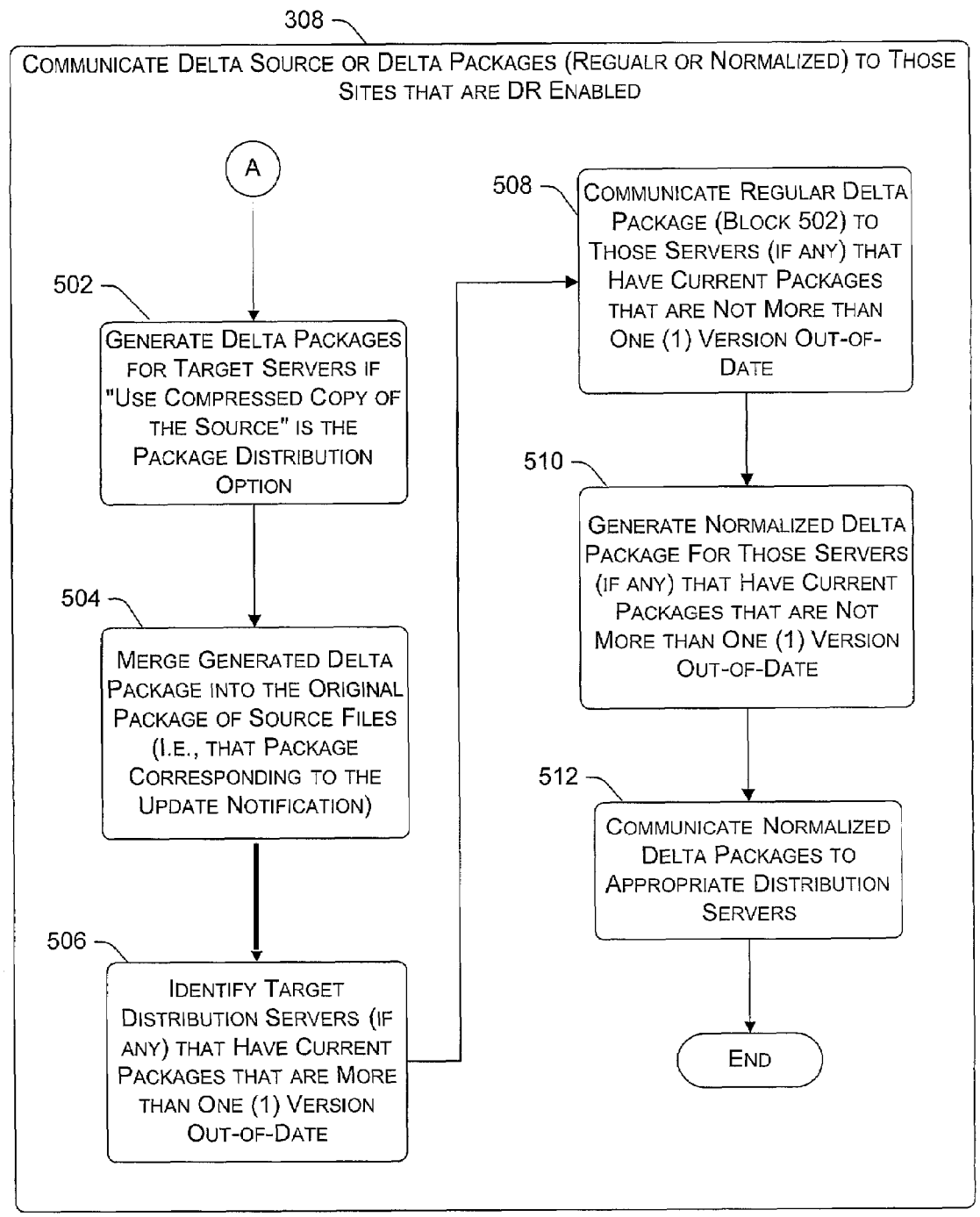
FIG. 5 shows further aspects of the exemplary procedure of FIG. 3 to perform DR of source files and packages across networked resources. Specifically.

At block 404, if "always obtain files from source directory" is not the package distribution option, the specifics of block 308 of procedure 300 continue at page reference "A", block 502 of FIG. 5. Otherwise, at block 406, the package manager 210 performs a mirror copy operation of the delta source files 218 to the site 106 DPs 108. To accomplish this operation, the delta source manager 210 compares file attributes between source files in the new package 222 to the software inventory or source files that are already at respective targeted distribution servers 108. The source file attributes that are compared in this operation include, for example, file name, file size, file time stamp, and/or file path.

The delta package manager 210 maintains site software inventories in the software inventory 216 data file. If a particular source file in the new package 222 is different (e.g., added, removed, modified, etc.) as compared to a source file on a particular distribution server 108, the particular source file is copied to the particular distribution server 108; otherwise the particular source file is not copied to the particular distribution server 108.

The particular data distribution determination operations of blocks 402 and 404 (i.e., whether package or source files are to be communicated to child sites 106) are more specifically directed to an enterprise's centralized source server 108. When a child site 106 receives a package or source files from a parent site 102 or 106, the any further dissemination of the received package of source file is communicated to any of the receiving site's 106 children sites 106 (if any), in the same manner as they were received.

FIG. 5 shows further aspects of the exemplary procedure 300 of FIG. 3 to perform delta replication of source files and packages across networked resources. Specifically, FIG. 5 shows further exemplary aspects of communicating delta source or delta packages to those sites 108 that are DR enabled, as described above with respect to block 308 of FIGS. 3 and 4.

At block 502, if "use a compressed copy of the source" was the package distribution option, the delta package manager 210 generates a delta package 218 by comparing the source files in the originally distributed full package 222 to the source file contents of the new package 222. The differences between the original package 222 and the new package 222 are saved to the new delta package 218.

At block 504, the package manager 210 merges the newly generated delta package 218 (block 502) into the original compressed package file 222 which corresponds to the received update notification (block 302 of FIG. 3), to generate the binary equivalent of a full compression of the source files in the new package 222. This compressed updated full package 222 is then stored for subsequent use (e.g., for responding to additional update notification messages (block 302 of FIG. 3), for use in an auto-recovery mechanism of block 312 of FIG. 3, etc.) by the source server 108.

At block 506, the delta package manager 210, for each distribution server 108 that is targeted to receive the package update (block 302 of FIG. 3), determines whether the version of the package that is currently being used by each respective targeted distribution server 108 is more than one (1) version out of date from the source files represented in the received package update (block 302). At block 508, for each respective distribution server 108 using a package that is not more than one version out of date as compared to the received package update (block 302), the delta package manager 210 communicates the newly generated delta package 218 (block 502) to the respective distribution server 108.

At block 510, for each respective distribution server 108 that currently has a package that is more than a single version out of date as compared to the received package update (block 302), the delta package manager 210 generates a corresponding normalized delta package 218. A normalized delta package 218 includes the entire source files required to bring a particular distribution server 108 from its outdated version of source files to the current source file versions, as represented by the newly generated delta package 218.

To perform this normalization operation, the delta package manager 210 determines each of the respective source files that are needed to bring the respective distribution server 108 content from its particular version of source files to the current version of source files, as represented by the newly generated delta package 218 (block 502). The delta package manager 210 merges one or more previously generated delta packages 218 with the newly generated delta package 218 (block 502 to generate a normalized delta package 218 based on these determined source file differences.

Previous delta package files 218 are cached by the package manager 210 up to a maximum number identified in a particular source distribution server's 108 configuration data 220. Such a maximum delta package cache number can be based on a number of criteria. For instance, a default number of cached delta packages 218 may depend on the particular site 106 configuration of a system 100; the number of child sites 106, the number and frequency of updates to packages 222, and so on.

Alternatively, the package manager 210 can generate a normalized delta package 218 that includes only those source file differences required to bring a particular software application on a distribution server 108 from a particular version up to another specified version, which does not necessarily need to be the most recent version. The package/source manager 210 determines which software application version the distribution server 108 desires in any one of a number of different ways. For instance, the package/source manager 210 can inquire via a communicate message to the server 108, as to which version of the software application is desired and responsive to such an inquiry, the distribution server 108 responds with its desired version. Additionally, such versioning information can be stored as configuration data 220 and updated accordingly.

At block 512, the delta package manager 210 communicates the respective normalized delta package(s) 218 to those distribution servers 108 that have a corresponding package that is more than a single version out of date as compared to the received package update (block 304).

Computer-Readable Media

Exemplary subject matter to perform delta replication of source files and packages from a central parent site 102 across a communication path 104 such as a network (e.g., an organizational intranet and/or the Internet) to any number of child sites 106 may be stored on or transmitted across some form of computer-readable media. Computer-readable media can be any available media that can be accessed by a computer. By way of example, and not limitation, computer readable media may comprise "computer storage media" and "communications media."

"Computer storage media" include volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

CONCLUSION

The described arrangements and procedures provide for performing delta replication of source files and packages across networked resources. Although the arrangements and systems to perform delta replication of source files and packages across networked resources have been described in language specific to structural features and methodological operations, it is to be understood that the arrangements and procedures as defined the appended claims are not necessarily limited to the specific features or operations described. Rather, the specific features and operations are disclosed as preferred forms of implementing the claimed subject matter.

The invention claimed is:

1. A computer-implemented method for replicating source files across networked resources, the method comprising:
   receiving, by a central source server from distribution server, a package update notification indicating a difference between a previous set of source files and one or more new sets of source files; and
   responsive to receiving the package update notification:
      identifying, by the central source server, a delta set of source files that correspond to the difference, wherein the delta set of source files includes scripts that upgrade, maintain, or repair one or more executable software applications;
      normalizing, by the central source server, previously cached delta packages into a single most recent delta package that incorporates the difference represented by the delta set of source files and removes redundant data from the previously cached delta packages;
      determining, by the central source server, a set of distribution servers in an enterprise network that are configured for delta replication to one or more client computing devices;
      communicating, by the central source server, the normalized delta package to the set of distribution servers;
      determining, by the central source server, a respective success or failure status corresponding to communicating the normalized delta package to each of the distribution servers; and
      responsive to the determining, re-communicating, by the central source server, the normalized delta package to each distribution server of the distribution servers with an associated failure status.

2. The method of claim 1, wherein the difference corresponds to modification, removal, or addition of a source file to the previous set of source files.

3. The method of claim 1, wherein the communicating further comprises:
   compressing the delta set of source files into the normalized delta package; and
   communicating the normalized delta package to the set of source and/or distribution servers for subsequent unpacking, installation, and/or further distribution.

4. The method of claim 1, wherein communicating the normalized delta package further comprises mirroring the normalized delta package to the distribution servers.

5. The method of claim 1, before the operation of communicating, further comprising:
   identifying, by the central source server, a particular one server of the set of distribution servers that has a current package of a first particular version that is more than one version out of date as compared to a second particular version represented by the new set of source files; and generating, by the central source server, a normalized delta package comprising a set of source files that can be used by the particular one server to update the current package to at least an intermediate version between the first particular version and the second particular version.

6. The method of claim 1, before the operation of communicating, further comprising:

identifying, by the central source server, a particular one server of the set of distribution servers that has a current package that is more than one version out of date as compared to a particular version represented by the new set of source files; and generating, by the central source server, a normalized delta package comprising a set of source files that can be used by the particular one server to update the current package to the particular version.

7. The method of claim 1, further comprising deleting, by the central source server, the previously cached delta packages.

8. A computer-readable storage medium comprising computer-executable instructions for replicating source files across networked resources, the computer-executable instructions comprising instructions for:

receiving, by a manager module executing at a primary server, a package update notification corresponding to a difference between a previous set of source files and one or more new sets of source files;

responsive to receiving the package update notification, identifying, by the manager module, a delta set of source files that correspond to the difference, wherein the delta set of source files includes scripts that upgrade, maintain, or repair one or more executable software applications;

normalizing, by the manager module, previously cached delta packages into a single most recent delta package that incorporates the difference represented by the delta set of source files and removes redundant data from the previously cached delta packages;

determining, by the manager module, a set of distribution servers in an enterprise network that are configured for delta replication;

communicating, by the manager module, the normalized delta package to the distribution servers;

determining, by the manager module, a respective success or failure status corresponding to communicating the normalized delta package to each of the distribution servers; and responsive to determining a failure status corresponding to a particular one server of the distribution servers, re-communicating, by the managed module, the normalized delta package to the particular one server.

9. The computer-readable storage medium of claim 8, wherein the difference corresponds to modification, removal, or addition of a source file to the previous set of source files.

10. The computer-readable storage medium of claim 8, wherein the instructions for communicating the normalized delta package further comprises instruction for:

compressing the delta set of source files into the delta package; and communicating the normalized delta package to the set of servers for subsequent unpacking, installation, and/or further distribution.

11. The computer-readable storage medium of claim 8, wherein the instructions for communicating the normalized delta package further comprises instructions for mirroring the normalized delta package to the distribution servers.

12. The computer-readable storage medium of claim 8, before the instructions for communicating, further comprising instructions for:

identifying, by the manager module, a particular one server of the distribution servers that has a current package with a first particular version that is more than one version out of date as compared to a second particular version represented by the new set of source files; and generating, by the manager module, a normalized delta package comprising a set of source files that can be used by the particular one server to update the current package to at least an intermediate version between the first particular version and the second particular version.

13. The computer-readable storage medium of claim 8, further comprising instructions for deleting, by the managed module, the previously cached delta packages.

14. A central source server computing device for replicating source files across networked resources, the server computing device comprising:

a processor; and a memory coupled to the processor, the memory comprising computer program instructions executable by the processor for:

receiving a package update notification from an administrative console application, the package update notification corresponding to a difference between a previous set of source files and one or more new sets of source files;

responsive to receiving the package update notification, identifying a delta set of source files that correspond to the difference wherein the delta set of source files includes scripts that upgrade, maintain, or repair one or more executable software applications;

normalizing previously cached delta packages into a single most recent delta package that incorporates the difference represented by the delta set of source files and removes redundant data from the previously cached delta packages;

determining a set of distribution servers in an enterprise network that are configured for delta replication;

communicating the normalized delta package to the distribution servers;

determining a respective success or failure status corresponding to communicating the normalized delta package to each of the source and/or distribution servers; and responsive to determining a failure status corresponding to a particular one server of the distribution servers, re-communicating the normalized delta package to the particular one server.

15. The server computing device as recited in claim 14, wherein the difference corresponds to modification, removal, or addition of a source file to the previous set of source files.

16. The server computing device as recited in claim 14, wherein the instructions for communicating the normalized delta package further comprises instruction for:

compressing the delta set of source files into the normalized delta package; and communicating the normalized delta package to the set of servers for subsequent unpacking, installation, and/or further distribution.

17. The server computing device as recited in claim 14, wherein the instructions for communicating the normalized delta package further comprises instructions for mirroring the normalized delta package to the distribution servers.

18. The server computing device as recited in claim 14, before the instructions for communicating, further comprising instructions for:
- identifying a particular one server of the distribution servers that has a current package with a first particular version that is more than one version out of date as compared to a second particular version represented by the new set of source files; and
- generating a normalized delta package comprising a set of source files that can be used by the particular one server to update the current package to at least an intermediate version that is between the first particular version and the second particular version.

19. The server computing device as recited in claim 14, further comprising instructions for deleting the previously cached delta packages.

20. A central server computing device for replicating source files across networked resources, the central server computing device comprising processing means for:
- receiving a package update notification corresponding to a difference between a previous set of source files and one or more new sets of source files the package update notification being received from a distribution server coupled to the central server;
- responsive to receiving the package update notification, identifying a delta set of source files that correspond to the difference, wherein the delta set of source files includes scripts that upgrade, maintain, or repair one or more executable software applications;
- normalizing previously cached delta packages into a single most recent delta package that incorporates the difference represented by the delta set of source files and removes redundant data from the previously cached delta packages;
- determining a set of distribution servers in an enterprise network that are configured for delta replication;
- communicating the normalized delta package to distribution servers for subsequent distribution to other computing devices;
- determining a respective success or failure status corresponding to communicating the normalized delta package to each of the distribution servers; and
- responsive to determining a failure status corresponding to a particular one server of the distribution servers, re-communicating the normalized delta package to the particular one server.

21. The central server computing device of claim 20, wherein the difference corresponds to modification, removal, or addition of a source file to the previous set of source files.

22. The central server computing device of claim 20, wherein the means for communicating the normalized delta package further comprises means for:
- compressing the delta set of source files into the normalized delta package; and
- communicating the normalized delta package to the set of servers for subsequent unpacking, installation, and/or further distribution.

23. The central server computing device of claim 20, wherein the means for communicating the normalized delta package further comprises means for mirroring the normalized delta package to the distribution servers.

24. The central server computing device of claim 20, further comprising means for:
- identifying a particular one server of the distribution servers that has a current package of a first particular version that is more than one version out of date as compared to a second particular version represented by the new set of source files; and
- generating a normalized delta package comprising a set of source files that can be used by the particular one server to update the current package to at least an intermediate version between the first particular version and the second particular version.

25. The central server computing device of claim 20, further comprising means for deleting the previously cached delta packages.

\* \* \* \* \*